Feb. 19, 1957     J. G. SUTTON, JR     2,781,770

REGULATORS

Filed Aug. 17, 1953     2 Sheets-Sheet 1

INVENTOR.
JOHN G. SUTTON, JR.
BY Zugelter & Zugelter
Attys.

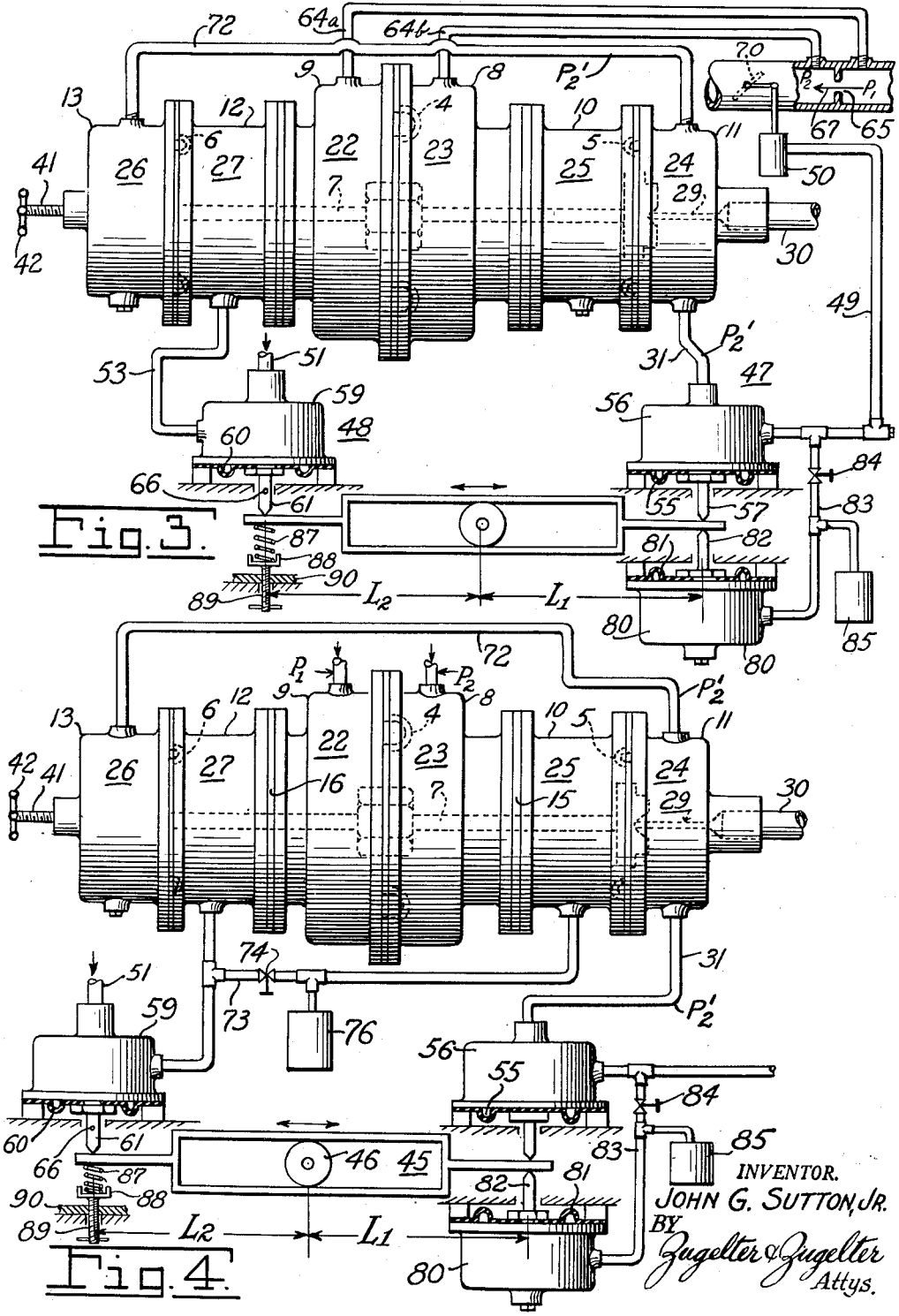

United States Patent Office

2,781,770
Patented Feb. 19, 1957

2,781,770
REGULATORS

John G. Sutton, Jr., Pittsburgh, Pa., assignor to Hogan Corporation, Pittsburgh, Pa., a corporation of Pennsylvania Application August 17, 1953, Serial No. 374,785

10 Claims. (Cl. 137—85)

This invention relates to regulators, and particularly to regulators that are responsive to pressure inputs and provided with means for converting the inputs into pressure outputs.

As usually constructed, pressure responsive regulators have more or less fixed gradient, and the sensitivity of the regulator is to a large measure, determined by its gradient.

An object of this invention is to provide a regulator in which the gradient or sensitivity thereof may be varied by applying to the regulator either a positive or a negative feedback from a pressure sending device.

Another object of the invention is to provide a regulator comprising a multi-diaphragm device, one of which diaphragms is responsive to a pressure input such as a pressure differential, and a valve for sending a variable pressure from a supply source of constant value, and a pressure responsive relay having a pressure responsive diaphragm connected to the output of the multi-diaphragm device and a valve mechanism arranged to develop a pressure output that is fed back to one of the diaphragms of the multi-diaphragm device whereby the gradient or sensitivity of the regulator comprising the relay and the multi-diaphragm device, may be controlled.

Another object of the invention is to provide an arrangement such as set forth in the next preceding object, in which the relay is provided with an adjustable fulcrum whereby the gradient may be adjusted.

A still further object of the invention is to provide a regulator comprising a multi-diaphragm device and a relay of the type set forth above in which the multi-diaphragm device is provided with an internal feedback connection affecting certain of its diaphragms and with an external feedback connection to the relay, the external feedback being adjustable at will.

Other objects of the invention will in part be apparent and will in part be obvious from the following description taken in conjunction with the accompanying drawings in which:

Figs. 3 and 4 are views showing modified arrangements of the regulators of Figs. 1 and 2, which include automatic reset and remote set point adjustment features, respectively.

Figure 1:
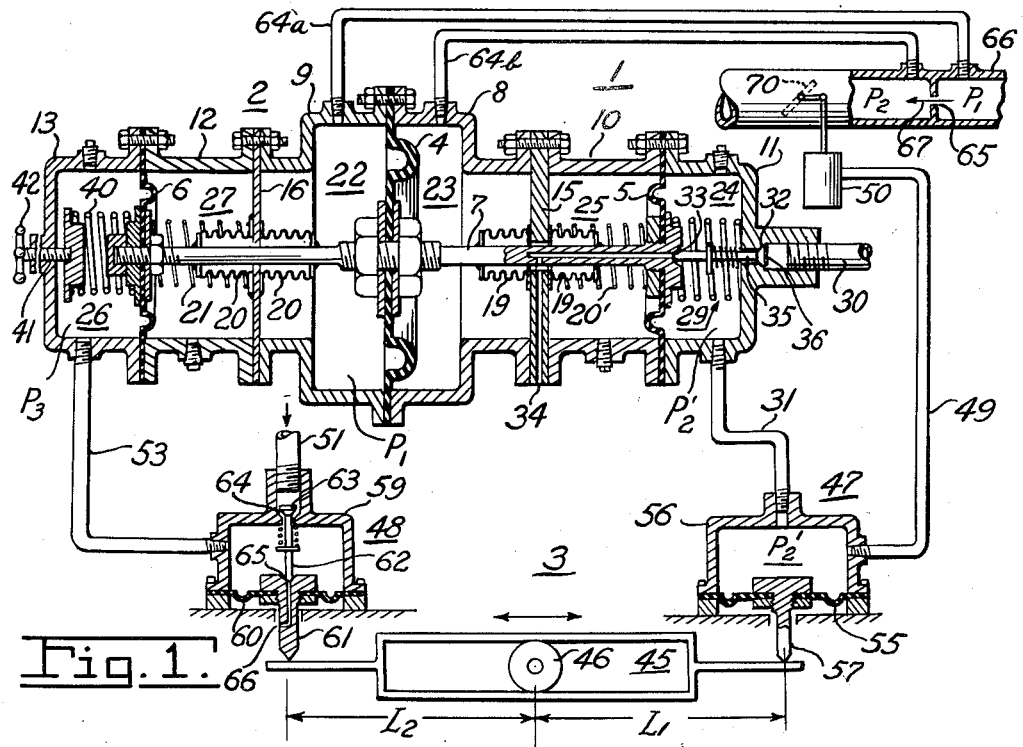
Figure 1 is a more or less diagrammatic view in section of a regulator embodying a form of the invention.

In Figure 1 of the drawing is illustrated a regulator 1 provided with means whereby the gradient or sensitivity thereof may be adjusted at will. The regulator comprises a multi-diaphragm device 2 and a relay 3.

The device 2 includes a pressure input responsive diaphragm 4 and a plurality of auxiliary diaphragms 5 and 6. Diaphragms 4, 5 and 6 are connected together by a rod or link 7 so that all of them can move together in whichever direction the diaphragms are urged. These diaphragms may have equal effective areas, or, depending upon the application to which the regulator is put, diaphragm 4 may be larger than diaphragms 5 and 6. Ordinarily, diaphragms 5 and 6 will have equal effective areas.

The diaphragms are mounted in a pressure-tight housing comprising sections 8, 9, 10, 11, 12 and 13. Sections 8 and 9 as illustrated, are of larger diameter at the parting line than sections 10, 11, and 12, 13 are at their respective parting lines. The marginal edge of diaphragm 5 is disposed between the parting line of sections 10 and 11 and is clamped firmly between them by suitable bolts as shown. Similarly, the marginal edge of diaphragm 6 is clamped between sections 12 and 13 by suitable bolts. A partition 15 is clamped between sections 8 and 10 at their respective parting lines by means of bolts as indicated and a partition 16 is clamped between sections 9 and 12 by bolts. In order that the chambers at opposite sides of diaphragm 4 may be segregated pressure-wise from the chambers between diaphragms 5 and 6 and their respective partitions 15 and 16, flexible tubular seals 19 and 20 are disposed about the link 7, as shown. The adjacent ends of tubular seals 19, 19 and 20, 20 are secured by brazing or clamping to the opposite faces of partitions 15 and 16, respectively, and the opposite ends thereof are brazed to link 7, as shown. If desired, light compression springs 20' and 21 may be interposed between diaphragm 5 and partition 15, and diaphragm 6 and partition 16, these springs being merely of sufficient tension to center the diaphragms.

The construction of device 2 as thus far described, provides a plurality of pressure receiving chambers 22, 23, 24, 25, 26, and 27.

Housing section 11 is provided with a valve 29 whereby pressure such as compressed air, may be delivered from a supply pipe 30 into chamber 24, and thence from the chamber through an output pipe 31 leading to relay 3. As shown, the valve includes an inlet port 32 to which pipe 30 is connected and an exhaust port 33 in the central portion of diaphragm 5. The exhaust port leads into the space within seal 19, from which pressure may escape through a lateral exhaust port 34 formed in partition 15. The valve also includes a valve stem 35 having at one end a valve element 36 adapted to open or close port 32. The opposite end of the valve stem 35 is shaped to seat in the exhaust port seat 33 and close it when the diaphragms are in neutral or centered position. If the motion of the diaphragms is to the right as seen in Fig. 1, the inlet port 32 is uncovered whereby pressure is admitted to chamber 24. If the motion is to the left of neutral, the inlet port is closed by valve element 36 and the end of valve stem 35 is unseated from the exhaust port seat so that pressure in chamber 24 may escape through the exhaust port and the lateral port 34 to the atmosphere.

In order to load the diaphragms of the device 2 so that the zero point of machine or device 2 may be adjusted, a compression spring 40 may be provided in chamber 26 and connected to a screw 41 threaded into the casing section 13, the screw being provided with a hand wheel 42 for turning the same. By adjusting the compressive force of spring 40 the amount of constant force applied to all of the diaphragms and urging them to the right, as seen in Fig. 1, may be adjusted. In other words, if the spring 40 is adjusted to exert a force to the right, a pressure will be established in chamber 24 that will develop an opposing force on diaphragm 5 sufficient to balance the force of spring 40.

Relay 3 comprises a beam 45 that is mounted on an adjustable fulcrum 46 and pressure-actuated diaphragm devices 47 and 48 that act on the beam on opposite sides of the fulcrum. Device 47 receives pressure from pipe 31 and transmits that pressure through a pipe 49 to a device to be controlled, for example, a damper or valve regulator 50. Device 48 includes a valve mechanism whereby pressure from a pipe 51 connected to a constant source of pressure supply, may be delivered by a pipe 53 to one of the chambers 25, 26 or 27 of device 2, as, for example, chamber 26, as shown.

Device 47 comprises a pressure-tight housing 56, one end of which is closed by a diaphragm 55. Diaphragm 55 is provided with a stem 57 that bears on beam 45. The force exerted by diaphragm 55 on beam 45 is proportional to its effective area and the magnitude of the pressure received from pipe 31.

Device 48 comprises a pressure-tight housing 59 which is closed at one end by a diaphragm 60. Diaphragm 60 is connected by a stem 61 to beam 45. The valve mechanism of device 48 comprises a valve stem 62 having at its upper end a valve element 63 disposed to open or close an inlet port 64 in the inlet to the housing. Pipe 51, as shown, is connected to the housing, so as to supply pressure to the inlet port 64. The opposite end of the valve stem is seated in an exhaust port 65 formed in the central portion of the diaphragm. That exhaust port communicates with a passageway 66 in stem 61 which leads to the atmosphere.

The lengths of the lever arms from the respective stems 57 and 61 to fulcrum 46 may be designated $L_1$ and $L_2$. If these lever arms are equal and if the effective areas of diaphragms 55 and 60 are equal, then the pressure established by valve 63 in the chamber of housing 59 and acting on diaphragm 60, will be equal to and balance the pressure supplied by pipe 31 to housing 56 of the diaphragm device 47. If the lever arms $L_1$ and $L_2$ are changed, as by changing the position of the fulcrum 46, the pressure established by the valve in the chamber of housing 59 and required to balance the force of diaphragm 55 will be proportional to a constant, K, times the pressure in the chamber of housing 56. The constant will be proportional to the ratio $$\frac{L_1}{L_2}$$

As shown in Figure 1, chambers 22 and 23 are connected by pipes 64a and 64b to opposite sides of an orifice 65 in a pipe 66. If it be assumed that fluid flows through the conduit 66 in the direction of arrow 67, then a pressure differential $(P_1-P_2)$ will be developed, $P_1$ being the pressure on the upstream and $P_2$ the pressure on the downstream side of the orifice. The pressure differential $(P_1-P_2)$ acts on diaphragm 4. If the differential $(P_1-P_2)$ increases from one value to another, diaphragm 4 will be deflected to the right whereby valve port 32 is uncovered, pressure is communicated to chamber 24 and from that chamber by pipe 31 to the chamber in housing 56 of relay 3. The pressure acting in chamber 24 also acts on diaphragm 5 whereby a force is developed tending to oppose the force of the pressure differential acting on diaphragm 4 and to move the valve 36 towards closed position. When the pressure is communicated to the chamber of housing 56, beam 45 turns clockwise whereby valve port 64 of diaphragm housing 59 is opened and pressure is admitted to the chamber thereof which acts on diaphragm 60, whereby a force is developed tending to turn beam 45 counter-clockwise. The pressure in the chamber of housing 59 is communicated to chamber 26 of device 2 and that pressure acts on diaphragm 6. The pressure acting on diaphragm 6 develops a force acting to the right, as seen in Figure 1, and is opposed to the force developed by the pressure in chamber 24 on diaphragm 5. When the forces acting on diaphragms 4 and 6 are equal and opposite to the force of pressure differential acting on diaphragm 5, valve element 36 will be seated on the inlet port 32 to close the same and also the exhaust port will be closed by the opposite end of the valve stem 35.

The output pressure $P_2'$ in pipe 49, which is delivered to regulator 50, will cause that regulator to adjust the position of a damper 70 in line or conduit 66, so that the pressure differential $(P_1-P_2)$ will be restored to the set point of regulator 1. The set point of regulator 1 is governed by the tension of spring 40. If the fulcrum of relay 3 is positioned towards the left end of beam 45 so that the ratio of $$\frac{L_1}{L_2}$$

is greater than unity, the pressure established in the chamber of housing 59 to balance the pressure in chamber 56 will be greater by the ratio of $$\frac{L_1}{L_2}$$

Therefore, the range of values of the feed back pressure to chamber 26 of device 2 will be greater. By making the ratio of the lever arms $$\frac{L_1}{L_2}$$

greater than 1, the regulator will have a positive gradient which can be adjusted at will by changing the position of fulcrum 46.

Device 3 may be located in close proximity to device 2, or it may be located at a remote point, as, for example, it may be located close to regulator 50, which may be at a substantial distance from device 2.

The characteristics of the regulator 1 connected as in Fig. 1, may be illustrated by the following equations. In these equations forces acting to the right will be regarded as positive and those to the left as negative:

Let $A=$ the effective area of diaphragm 4, and $A_1$ the effective area of each of diaphragms 5 and 6;

Let $(P_1-P_2)=P_I$ the input pressure; the pressure in chamber 24, $P_2'$ the output pressure; the pressure in chamber 26, $P_3$; and $F_1$, the force of spring 40.

The equation for the summation of forces=0 may be written as follows:

$$P_I A + F_1 + P_3 A_1 - P_2' A_1 = 0 \therefore P_2' A_1 = P_I A + P_3 A_1 + F_1$$

$$P_2' = \frac{P_I A + P_3 A_1 + F_1}{A_1}$$

but $$P_3 = \left(\frac{L_1}{L_2} P_2'\right) = K' P_2'$$

by substituting, $K'P_2'$ for $P_3$ $$P_2' = \frac{P_I A + K' P_2' A_1 + F_1}{A_1}$$

and $$A_1 P_2' - K' P_2' A_1 = P_I A + F_1 \therefore A_1 P_2'(1-K') = P_I A + F_1$$

and $$P_2' = \frac{P_I A + F_1}{A_1(1-K')} = K_x(P_I A + F_1)$$

where $$K_x = \frac{1}{A_1(1-K')}$$

Figure 2:
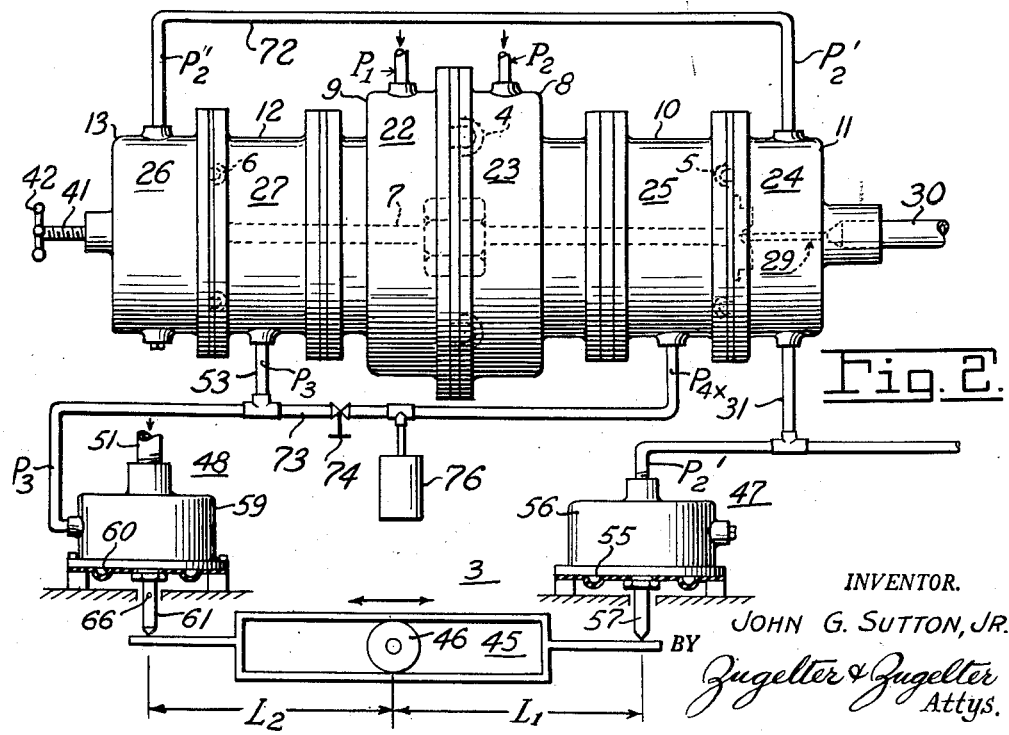
Fig. 2 is a view of the regulator shown in Fig. 1 but modified to provide both internal and external feedbacks to one component of the regulator and automatic reset operating characteristics.

In the arrangement of Fig. 2, devices 2 and 3 are shown as being identical in construction, therefore, corresponding parts will be designated by the same reference characters. As illustrated in Fig. 2, there is provided an internal feedback connection 72 whereby chambers 24 and 26 are connected together so that the pressure in these chambers will always be equal to each other. If the effective areas of diaphragms 5 and 6 are equal, it will be apparent that the forces developed by the pressures in chambers 24 and 26 on diaphragms 5 and 6, will be equal and opposite.

The arrangement in Fig. 2 is also provided with an external feedback. The external feedback comprises a connection from the outlet port of housing 59 to chamber 27 and a connection by means of pipe 73 leading from pipe 53 to chamber 25 of device 2. In pipe 73 is a restriction or orifice 74. The restriction or orifice may comprise a needle valve which may be adjusted as desired. A volume chamber 76 is connected to pipe 73 at a point between the needle valve 74 and chamber 25. Pressure will flow from pipe 53 through pipe 73 and the restriction 74 to chamber 25, and the rate at which pressure flows will be governed by the setting of the needle valve.

When a stable condition develops, as where the pressure in pipe 53 reaches a steady value, it will be apparent that the pressure in chamber 25 will ultimately increase to the value of the pressure in chamber 27. If the pressure in pipe 53 decreases, it follows that the pressure in chamber 25 will also decrease, but the rate at which it decreases will depend upon the volume of and the flow from, chamber 76 and the setting of the needle valve 74.

The performance of the regulator arrangement of Fig. 2 is illustrated by the following equations:

Let $P_1 - P_2 = P_I$, the input pressure; $P_2'$, the pressure in chambers 24 and 26 which is the output pressure; $P_3$, the pressure in chamber 27; $P_{4x}$, the pressure in chamber 25; and $F_1$, the force of spring 40.

Let the effective area of diaphragm 4 be A and the effective areas of diaphragms 5 and 6 be $A_1$;

Let the forces on the diaphragms acting to the right be positive and those to the left be negative. Then at stable condition the equation for the sum of these forces being equal to zero may be stated as follows:

$$P_I A + P_2' A_1 + P_{4x} A_1 + F_1 - P_2' A_1 - P_3 A_1 = 0$$

$$P_I A = P_3 A_1 - P_{4x} A_1 - F_1$$

$$P_3 = P_I \frac{A}{A_1} + P_{4x} + \frac{F_1}{A_1}$$

but $$P_3 = \frac{L_1}{L_2} \cdot P_2' = K P_2' \therefore P_2' = \frac{P_I \frac{A}{A_1} + P_{4x} + \frac{F_1}{A_1}}{K}$$

if $F_1 = 0$ $$P_2' = \frac{K' P_I + P_{4x}}{K}$$

The regulator arrangements of Figs. 1 and 2 have automatic reset action, because the value $P_1 - P_2$ is regulated back to the set point automatically. The arrangement, as illustrated in Figs. 3 and 4, also embodies automatic reset action. Also, they are provided with means whereby the relay may be biased to work in either direction and provide set point adjustment of the regulator from a remote point. Parts of Figs. 3 and 4 corresponding to those of Figs. 1 and 2, will be designated by the same reference characters.

The regulators of Figs. 3 and 4 are so designed that relays 3 may be located at points remote from device or components 2. When so located, the control or set point may be adjusted at such remote location. The regulators of Figs. 3 and 4 have rate response and automatic reset characteristics, as will appear infra.

In Fig. 3, chamber 24 is connected to chamber 26 by the feedback pipe or connection 72, as in Fig. 2, but pipe 53 is connected to chamber 27. Relay 3 is provided with a diaphragm housing 80 which is closed at one end by a diaphragm 81 connected by a stem 82 to lever 45 in opposition to the diaphragm 55 of housing 56. Pressure delivered to housing 56 is communicated to housing 80 through a pipe 83 in which is a restriction such as an adjustable needle valve 84. A volume chamber 85 is connected to pipe 83 between the restriction 84 and the housing 80.

An adjustable compression spring 87 is placed under beam 45 at the $L_2$ end thereof and exerts a force opposing that of diaphragm 60. The lower end of the spring may be supported in a cup 88 having a screw 89 threaded in a fixed support 90 whereby the force urging the beam clockwise may be adjusted. The pressure output to pipe 53 from housing 59 will be a function of the force of spring 87 as modified by the difference between the pressures in housings 56 and 80.

When the pressure in chambers 56 and 80 are equal, the pressure output from housing 59 will be directly proportional to the force of spring 87.

In the arrangement of Fig. 3, it will be seen that, as the pressure in chamber 56 increases, the force of that pressure will be added to the force of spring 87 so that the pressure in chamber 59 must increase to a value that will balance these forces. As the pressure in chamber 80 increases with respect to the pressure in chamber 56, the force exerted by diaphragm 55 will be diminished by the opposing force of diaphragm 81. As this force diminishes, the pressure in chamber 59 will diminish so that the output pressure from chamber 59 to diaphragm chamber 27 of device 2 will likewise diminish to a value determined by the force of spring 87.

When the set point of regulators of Figs. 3 and 4 have been reached, that is, when the pressure differential $P_1 - P_2$ has been brought back to its set point as determined by the setting of spring 87, if there has been a departure from it, the pressure in housing 59 will be brought to balance with the force of spring 87.

The performance of the regulator of Fig. 3 may be expressed by the following:

Let $(P_1 - P_2)$ be $P_I$; $P_2'$ the pressure in chambers 24 and 26 and 56; $P_3$ the pressure in chamber 27; $(P_{2x})'$ the pressure in housing 80. $F_2$ the force of spring 87; $F_1$ the force of spring 40; $A_1$ the area of diaphragm 4; and $A_1$ the areas of diaphragms 5, 6, 55, 60 and 81.

When the regulator is in equilibrium, the algebraic sum of the forces acting on the diaphragms in device 2 is zero; also, the algebraic sum of moments of the forces acting on beam 45 about the beam fulcrum is zero.

$\therefore (a) \qquad P_I A + P_2' A_1 + F_1 - P_3 A_1 - P_2' A_1 = 0$ $(b) \qquad P_I A = P_3 A_1 - F_1$ $(c)$ but $P_3 = F_2 + \frac{L_1}{L_2}(P_2' - (P_{2x})') = F_2 + K(P_2' - (P_{2x})')$ Substituting $F_2 + K(P_2' - (P_{2x})')$ for $P_3$ in (b)

$(d) \qquad P_I A = F_2 + K(P_2' - (P_{2x})') - F_1$ $(e) \qquad \therefore P_I = A_1 \left[ \frac{F_2}{A} + \frac{K}{A}(P_2' - (P_{2x})') \right] - \frac{F_1}{A}$ and $(f)$ $$P_I = \frac{A_1}{A} \{ F + K(P_2' - (P_{2x})') \} - \frac{F_1}{A} =$$

$$K_2 \{ F_2 + K[P_2' - (P_{2x})'] \} - F_1$$

where $$K = \frac{L_1}{L_2} \text{ and } \frac{A_1}{A} = K_2$$

When $$P_2' = (P_{2x})'$$

$(g) \qquad P_I = K_2 F_2 - F_1$

The equations applicable to relay 3 of Fig. 3 are as follows:

$(h) \qquad F_2 L_2 + P_2' L_1 - P_3 L_2 - (P_{2x})' L_1 = 0 \therefore$ $(i) \qquad P_3 L_2 = F_2 L_2 + P_2' L_1 - (P_{2x})' L_1 \therefore$ $(j) \qquad P_3 = F_2 \frac{L_2}{L_2} + P_2' \frac{L_1}{L_2} - (P_{2x})' \frac{L_1}{L_2} \therefore$ (k)    $P_3 = F_2 + K_3[P_2' - (P_{2x})']$ where $K_3 = \dfrac{L_1}{L_2}$ ∴

(l)    $F_2 = P_3 - K[P_2' - (P_{2x})']$ substituting (l) in (g) above (m)    $P_1 = K_2\{P_3 - K[P_2' - (P_{2x})']\}$ When $P_2' = (P_{2x})'$ $P_1 = K_2 P_3$, which means that the set point pressure $P_1$ or $(P_1 - P_2)$ is determined by the value of the adjusted force $F_1$ of spring 87.

While the force of spring 87 determines the set or control point of the regulator of Fig. 3, diaphragm devices 47 and 80 of the relay provide rate response of the regulator while the pressures in housings 56 and 80 are unequal, the response being more pronounced the greater the pressure differences are:

In the arrangement of Fig. 4, the output to pipe 53 is supplied to chambers 27 and 25, there being an orifice 74 in the connection to chamber 25 and a volume chamber 76 connected to that connection at a point between the orifice and chamber 25. The effect of the pressure delivered from pipe 53 to chambers 27 and 25 is to equalize the forces developed by these pressures on diaphragms 5 and 6 when the pressure in chamber 25 is equal the pressure in chamber 27. While these pressures are unequal, the effect of the pressure in chamber 27 is to increase the output pressure of chamber 24. The output pressure from chamber 24 will remain relatively high until the pressure $P_1 - P_2$ has been reestablished at the set point value, the latter being preset by the tension in spring 87.

From the foregoing description, it will be apparent that the sensitivity or gradient of the regulators may be adjusted at will over a wide range, and that the adjustments may be accomplished without resorting to mechanical changes or adjustments within device 2 of the regulator. The only adjustment required to change the sensitivity or gradient is that of changing the position of the fulcrum 46 of relay 3, as to Figs. 1 and 2, or changing the fulcrum location and tension in spring 87, as to Figs. 3 and 4.

Having thus described the invention, it will be apparent to those skilled in this art, that various modifications and changes may be made in the illustrated embodiments without departing from either the spirit or scope of the invention. Therefore, what I claim as new and desire to secure by Letters Patent is:

1. A regulator comprising a multi-chambered housing having spaced diaphragms therein and pressure chambers on each side of the diaphragms, a link connecting said diaphragms, a valve actuated in response to movement of said diaphragms for developing an output pressure acting in one of said chambers, one of said diaphragms being responsive to a variable input pressure and developing a force opposing the force of the diaphragm to which the output pressure is applied, a relay comprising a beam having a fulcrum, a housing connected to said output pressure and having a diaphragm connected to said beam on one side of the fulcrum for exerting a turning force on the beam, a second housing having a diaphragm connected to the beam on the opposite side of the fulcrum, a valve actuated by said beam and adapted to establish a pressure in the second housing that will balance the turning force exerted on the beam by said first mentioned housing diaphragm, and a connection from the output of the beam actuated valve to a diaphragm chamber of said multi-chambered housing which exerts a force algebraically additive to the force of the input pressure diaphragm, the gradient of said regulator being dependent upon the pressure output of said beam actuated valve.

2. A regulator according to claim 1 characterized by the fact that the fulcrum is adjustable lengthwise of said beam whereby the gradient of said regulator is adjustable at will.

3. A regulator comprising a housing having a plurality of diaphragms therein dividing said housing into pressure receiving chambers, means coupling said diaphragms so that they move together, a valve actuated by movement of the diaphragms for establishing an output pressure, one of said diaphragms being responsive to a pressure input and having an effective area A, the other of said diaphragms each having an effective area $A_1$, the output pressure of said valve being connected to a chamber containing one of the $A_1$ diaphragms whose force of pressure opposes the force of the input pressure on diaphragm A, a relay having a diaphragm responsive to said output pressure of said valve, a relay valve actuated in response to the force of said output pressure on said relay diaphragm for developing a variable output pressure, means responsive to said relay valve output pressure for balancing the force developed by the pressure on said relay diaphragm, and a connection from said relay valve to another of the $A_1$ diaphragms whose force acts in opposition to the force developed by the pressure input diaphragm, whereby the regulator is automatically resetting.

4. A device according to claim 3 characterized by the fact that the relay is provided with means whereby the relation of the output pressure delivered to said relay diaphragm and the output pressure of said relay valve may be so adjusted as to modify the temporary gradient which is effective during a sudden change in the value of the input pressure.

5. A device according to claim 1 characterized by the fact that the relay may be located at a point remote from the multi-chambered housing.

6. A device according to claim 3 characterized by the fact that the relay may be located at a point remote from said housing.

7. A device according to claim 1 characterized by the fact that said relay is provided with adjustable means for presetting the control point of the regulator.

8. A device according to claim 1 characterized by the fact that the relay is provided with adjustable means for presetting the control point of the regulator, and with means for causing the relay to operate with adjustable rate response and automatic reset.

9. A device according to claim 3 characterized by the fact that said relay is provided with adjustable means for presetting the control point of the regulator.

10. A device according to claim 3 characterized by the fact that the relay is provided with adjustable means for presetting the control point of the regulator, and with means for causing the relay to operate with adjustable rate response and automatic reset.

References Cited in the file of this patent

UNITED STATES PATENTS

| | | |
|---|---|---|
| 1,279,693 | Herr et al. | Sept. 24, 1918 |
| 2,481,395 | Carns | Sept. 6, 1949 |
| 2,505,981 | McLeod | May 2, 1950 |
| 2,638,911 | Griswold et al. | May 19, 1953 |
| 2,651,317 | Heinz | Sept. 8, 1953 |

FOREIGN PATENTS

| | | |
|---|---|---|
| 544,643 | Great Britain | Apr. 22, 1942 |